(12) United States Patent
Dydensborg et al.

(10) Patent No.: US 11,142,870 B2
(45) Date of Patent: Oct. 12, 2021

(54) PACKAGING SHEET FOR PACKAGING OF CHEESE, AND ASSOCIATED PACKAGING AND MANUFACTURING METHODS

(71) Applicant: Danapak Flexibles A/S, Slagelse (DK)

(72) Inventors: Else Dydensborg, Odense S (DK); Peter Johansen, Odense C (DK)

(73) Assignee: Danapak Flexibles A/S, Slagelse (DK)

( * ) Notice: Subject to any disclaimer, the term of this patent is extended or adjusted under 35 U.S.C. 154(b) by 434 days.

(21) Appl. No.: 15/315,679

(22) PCT Filed: May 5, 2015

(86) PCT No.: PCT/DK2015/050114
§ 371 (c)(1),
(2) Date: Dec. 1, 2016

(87) PCT Pub. No.: WO2016/000712
PCT Pub. Date: Jan. 7, 2016

(65) Prior Publication Data
US 2017/0191222 A1    Jul. 6, 2017

(30) Foreign Application Priority Data
Jul. 4, 2014  (EP) .................................. 14175809

(51) Int. Cl.
*D21H 27/10*  (2006.01)
*B65D 85/76*  (2006.01)
(Continued)

(52) U.S. Cl.
CPC .............. *D21H 27/10* (2013.01); *B32B 7/12* (2013.01); *B32B 27/10* (2013.01); *B32B 37/14* (2013.01);
(Continued)

(58) Field of Classification Search
None
See application file for complete search history.

(56) References Cited

U.S. PATENT DOCUMENTS 3,876,452 A * 4/1975 Anspon ................... B32B 27/00
428/463
4,276,340 A * 6/1981 de Leiris .................... C08J 7/04
426/118
(Continued)

FOREIGN PATENT DOCUMENTS

CA     2 226 746 A1   12/1997
DE  102009050898 A *   4/2011
(Continued)

OTHER PUBLICATIONS

Huang, Chi-Hsien et al. "Predicting the Permeability and Tensile Properties of Multilayer Films from the Properties of the Individual Component Layers" Polymer Journal, vol. 36, No. 5, pp. 386-393 (2004). (Year: 2004).*
(Continued)

*Primary Examiner* — Vivian Chen
(74) *Attorney, Agent, or Firm* — Holland & Hart LLP

(57) ABSTRACT

Disclosed is a packaging sheet for packaging of cheese, in particular white moulded soft cheese. The packaging sheet comprises: an inner surface and an outer surface of the packaging sheet, said inner surface being configured for facing the cheese in a packaged use position of the packaging sheet; a paper layer with a first surface and a second surface; a coloured layer provided on a first surface of the paper layer, an outer surface of the coloured layer establishing said outer surface of the packaging sheet; and a polymer layer with a water vapour transmission rate of at least 300 g/m2/24 hours at 38° C. and 90% atmospheric humidity. The polymer layer being coated on the second surface of the paper layer with a first surface of the polymer layer facing
(Continued)

the paper layer and a second surface of the polymer layer establishing said inner surface of the packaging sheet.

12 Claims, 3 Drawing Sheets

(51) Int. Cl.
| | |
|---|---|
| D21H 19/20 | (2006.01) |
| D21H 19/28 | (2006.01) |
| D21H 21/28 | (2006.01) |
| D21H 19/24 | (2006.01) |
| D21H 19/02 | (2006.01) |
| B32B 7/12 | (2006.01) |
| B32B 27/10 | (2006.01) |
| B32B 37/14 | (2006.01) |
| B32B 38/00 | (2006.01) |
| B65B 11/00 | (2006.01) |
| B65B 25/06 | (2006.01) |
| B32B 27/06 | (2006.01) |
| B32B 27/20 | (2006.01) |
| B32B 27/30 | (2006.01) |
| B32B 27/36 | (2006.01) |
| B32B 27/08 | (2006.01) |
| B65D 81/24 | (2006.01) |
| B65C 1/02 | (2006.01) |
| C09J 123/08 | (2006.01) |
| B65D 85/50 | (2006.01) |
| C09J 123/26 | (2006.01) |
| B65B 25/00 | (2006.01) |
| D21H 19/10 | (2006.01) |
| D21H 19/36 | (2006.01) |
| B65B 25/10 | (2006.01) |

(52) U.S. Cl.
CPC .......... *B32B 38/145* (2013.01); *B65B 11/004* (2013.01); *B65B 25/068* (2013.01); *B65C 1/02* (2013.01); *B65D 85/76* (2013.01); *D21H 19/02* (2013.01); *D21H 19/20* (2013.01); *D21H 19/24* (2013.01); *D21H 19/28* (2013.01); *D21H 21/28* (2013.01); *B32B 27/06* (2013.01); *B32B 27/08* (2013.01); *B32B 27/20* (2013.01); *B32B 27/30* (2013.01); *B32B 27/308* (2013.01); *B32B 27/36* (2013.01); *B32B 2250/03* (2013.01); *B32B 2307/402* (2013.01); *B32B 2307/718* (2013.01); *B32B 2307/724* (2013.01); *B32B 2333/08* (2013.01); *B32B 2367/00* (2013.01); *B32B 2439/70* (2013.01); *B32B 2553/00* (2013.01); *B65B 11/00* (2013.01); *B65B 25/001* (2013.01); *B65B 25/06* (2013.01); *B65B 25/10* (2013.01); *B65D 81/24* (2013.01); *B65D 81/245* (2013.01); *B65D 85/50* (2013.01); *C09J 123/0869* (2013.01); *C09J 123/26* (2013.01); *D21H 19/10* (2013.01); *D21H 19/36* (2013.01); *Y10T 428/27* (2015.01); *Y10T 428/3179* (2015.04); *Y10T 428/3188* (2015.04); *Y10T 428/31786* (2015.04); *Y10T 428/31895* (2015.04); *Y10T 428/31906* (2015.04)

(56) References Cited

U.S. PATENT DOCUMENTS

| | | | | |
|---|---|---|---|---|
| 4,645,710 A * | 2/1987 | Baitinger | ............... | B32B 5/18 428/317.7 |
| 4,977,031 A * | 12/1990 | Temple | ............... | B65D 81/264 428/463 |
| 5,061,534 A * | 10/1991 | Blemberg | ............... | B32B 27/30 428/36.7 |
| 5,254,401 A * | 10/1993 | Kelch | ............... | B32B 5/18 428/317.1 |
| 5,332,616 A * | 7/1994 | Patrick | ............... | B32B 27/08 428/218 |
| 5,352,108 A * | 10/1994 | Kagawa | ............... | B26F 1/28 264/154 |
| 5,666,784 A * | 9/1997 | Weder | ............... | A01G 5/04 53/397 |
| 5,698,249 A * | 12/1997 | Hayashi | ............... | A23B 7/148 426/106 |
| 5,773,131 A * | 6/1998 | Dettling | ............... | D21H 19/18 162/137 |
| 5,832,699 A * | 11/1998 | Zobel | ............... | B65D 81/24 53/461 |
| 5,837,888 A * | 11/1998 | Mayer | ............... | G01N 15/0826 73/38 |
| 5,958,534 A * | 9/1999 | Marbler | ............... | B32B 27/10 428/36.6 |
| 6,022,627 A * | 2/2000 | Weder | ............... | A01G 5/04 206/213.1 |
| 6,068,897 A * | 5/2000 | Adur | ............... | B32B 27/10 428/34.2 |
| 6,296,923 B1 * | 10/2001 | Zobel | ............... | B65D 81/2076 426/118 |
| 6,316,067 B1 * | 11/2001 | Edwards | ............... | B32B 27/08 428/34.9 |
| 6,451,901 B1 * | 9/2002 | Maekawa | ............... | C08F 8/44 524/505 |
| 6,485,817 B1 * | 11/2002 | DeMeuse | ............... | B32B 27/32 428/213 |
| 6,524,712 B1 * | 2/2003 | Schledjewski | ............... | B32B 27/08 428/423.1 |
| 10,435,525 B2 * | 10/2019 | Schmitzer | ............... | C09J 7/29 |
| 2001/0003767 A1 | 6/2001 | Ito | ............... | C09J 123/06 525/120 |
| 2001/0017431 A1 * | 8/2001 | Pip | ............... | B29C 48/08 264/172.19 |
| 2002/0040098 A1 * | 4/2002 | Maekawa | ............... | C08L 51/006 525/88 |
| 2002/0054969 A1 * | 5/2002 | Clarke | ............... | B32B 5/18 428/35.2 |
| 2005/0064119 A1 * | 3/2005 | Hodson | ............... | B32B 27/32 428/35.7 |
| 2006/0165958 A1 * | 7/2006 | Sankey | ............... | B32B 3/10 428/138 |
| 2006/0233987 A1 * | 10/2006 | Mumpower | ............... | B32B 27/08 428/35.2 |
| 2007/0020466 A1 * | 1/2007 | Chen | ............... | B32B 27/28 428/447 |
| 2007/0275196 A1 * | 11/2007 | Opuszko | ............... | B32B 7/02 428/35.2 |
| 2010/0055273 A1 * | 3/2010 | Chen | ............... | C08L 23/0876 426/392 |
| 2011/0027601 A1 * | 2/2011 | Ruffner, Jr. | ............... | B32B 27/10 428/515 |
| 2011/0046284 A1 * | 2/2011 | Berube | ............... | C08L 9/08 524/322 |
| 2011/0189356 A1 | 8/2011 | Hanley | | |
| 2012/0134605 A1 * | 5/2012 | Avitsland | ............... | D21H 21/22 383/113 |
| 2012/0228182 A1 * | 9/2012 | Ting | ............... | C08J 7/047 206/524.3 |
| 2014/0363600 A1 * | 12/2014 | Dooley | ............... | B32B 27/32 428/36.91 |
| 2015/0050414 A1 * | 2/2015 | Durin-France | ............... | B65D 33/01 426/582 |
| 2016/0144604 A1 * | 5/2016 | Jenkins | ............... | B32B 27/08 428/216 |

FOREIGN PATENT DOCUMENTS

| | | | |
|---|---|---|---|
| EP | 0351115 B | * | 3/1995 |
| EP | 0351116 B | * | 9/1995 |
| EP | 0997395 A | * | 5/2000 |

(56) References Cited

FOREIGN PATENT DOCUMENTS

| | | | |
|---|---|---|---|
| EP | 1041010 A | * | 10/2000 |
| EP | 1 361 044 A2 | | 11/2003 |
| EP | 2 123 450 A1 | | 11/2009 |
| EP | 2 233 285 A1 | | 9/2010 |
| EP | 2 730 698 A1 | | 5/2014 |
| GB | 2 330 818 A | | 5/1999 |
| GE | 2 332 873 A | | 7/1999 |
| JP | 10-266100 A | * | 10/1998 |
| WO | WO 2006/011842 A1 | | 2/2006 |
| WO | WO 2019/112255 A1 | | 9/2009 |
| WO | WO 2010/025108 A1 | | 3/2010 |
| WO | WO 2011/054452 A1 | | 5/2011 |
| WO | WO 2013/098025 A1 | | 7/2013 |
| WO | WO 2013/102785 A1 | | 7/2013 |

OTHER PUBLICATIONS

Siracusa, Valentina. "Food Packaging Permeability Behaviour: A Report" International Journal of Polymer Science vol. 2012, Articles ID 302029 (2012). (Year: 2012).*

ISA International Search Report, Int'l Application No. PCT/DK2015/050114, dated Jun. 12, 2015, European Patent Office, P.B. 5818 Patentlaan 2, NL-2280, HV Rijswijk NL, 24 pgs.

* cited by examiner

PACKAGING SHEET FOR PACKAGING OF CHEESE, AND ASSOCIATED PACKAGING AND MANUFACTURING METHODS

FIELD

The present invention relates to a packaging sheet for packaging of cheese, in particular white moulded soft cheese, a method for manufacturing such sheet, and a method for wrapping cheese in such a sheet.

BACKGROUND

In a known packaging sheet for packaging of white moulded soft cheese, the packaging sheet comprises in sequence an outer, white coloured layer printed on an intermediate polyamide (PA) layer, an intermediate paper layer and an inner layer of a lacquer. The PA layer is extruded directly onto the paper with a thickness corresponding to about 15 g/m². The lacquer layer has high water vapour transmission rate, typically way above 1000 g/m²/24 hours at 38° C. and 90% atmospheric humidity, to allow the cheese to breathe, i.e to release or absorb water vapour and air. The inner lacquer layer faces the cheese when the cheese is wrapped around a piece of cheese forming a cheese package.

Different types of cheese have a varying optimal atmosphere with regard to shelf life, the aesthetics of the cheese during the shelf life, the condition of the cheese, e.g. consistency and taste, and other factors.

The above prior art packaging sheet has a number of drawbacks specifically when used for packaging of white moulded soft cheese. The high water vapour transmission rate of the inner lacquer layer allows for the paper layer to absorb relatively large amounts of vapourized water from the cheese, which also allows for mould on the cheese surface to grow through the inner lacquer layer and into the paper layer. Over time, the paper layer's water vapour absorbation rate varies as the water content of the paper layer approaches a saturation point. This means that the water vapour transmission rate through the PA layer also varies over time so that the optimal breathing conditions for the cheese will not be present over large amounts of the cheese's shelf time/lifetime.

The described uncontrolled mould growth results in undesired, yellowish spots or stains of mould in or on the paper layer or even a complete discoloration of the paper layer, which may often be seen from the outside of the cheese package through a transparent outer shrink film layer. This discolouration can often be seen distinctly even though the white printing layer may help hiding it. When opening the package so that the cheese is revealed, the cheese itself also has an undesired surface appearance since the mould may stick to the packaging sheet when it is peeled of or unwrapped due to the growth of mould into the packaging sheet. This further results in an undesired appearance of the inner surface of the packaging sheet, when the packaging sheet is unwrapped from the cheese when pieces of the cheese mould are stuck to the packaging sheet. Furthermore, taste and consistency of the cheese can be affected of the growth of mould into the packaging sheet.

Thus, it remains a problem to provide a packaging sheet for packaging of white moulded cheese that maintains its appearance over time whilst allowing the cheese to maintain its desired characteristics over its shelf life.

SUMMARY OF THE INVENTION

A first aspect the invention involves a packaging sheet for packaging of cheese, in particular white moulded soft cheese, comprising an inner surface and an outer surface of the packaging sheet, said inner surface being configured for facing the cheese in a packaged use position of the packaging sheet, a paper layer with a first surface and a second surface, a coloured layer provided at or on a first surface of the paper layer, an outer surface of the coloured layer establishing said outer surface of the packaging sheet, and a polymer layer with a water vapour transmission rate of at least 300 g/m²/24 hours at 38° C. and 90% atmospheric humidity, the polymer layer being positioned at, optionally coated on, the second surface of the paper layer with a first surface of the polymer layer facing the paper layer and a second surface of the polymer layer establishing the inner surface of the packaging sheet.

Consequently, by providing a packaging sheet with a polymer layer, the control of water and air flow through the packaging sheet, to and from cheese packaged within the packaging sheet, is optimized, thereby allowing the cheese to breathe continuously optimally and thus maintain its desired appearance and other characteristics over time.

Additionally, by providing a packaging sheet where the polymer layer is arranged between the paper layer and the cheese, a desirable barrier is obtained where spreading of mould from the cheese to the paper is also controlled, thereby allowing the packaging sheet to maintain its desired appearance over time.

The paper layer may be manufactured from conventional paper and mainly comprises cellulose fibres. The paper layer may comprise other additives such as bonding additives, adhesive additives or colouring agents. The paper layer may comprise machine glazed (MG) paper, i.e. paper given a high finish on one side only by drying the paper in continuous contact with a highly polished heated cylinder.

The paper layer may be provided in the packaging sheet with a thickness corresponding to 25 to 50 g/m², preferably 35 to 45 g/m².

The polymer layer preferably comprises at least 70 percent by weight of a polymer type, preferably at least 80 percent by weight, more preferred at least 95 percent by weight, and most preferred at least 98 percent by weight. The polymer type is preferably chosen from the group consisting of polyolefin, polyester, polyamid, poplypropylene and mixtures thereof. Such mixtures may be provided in the polymer layer as coextruded layers of different polymers, the different polymers each preferably being selected from the former group. In some embodiments, the polymer layer mainly comprises, preferably is substantially constituted by, polyester, preferably polyethylene terephthalate (PET).

The polymer layer may comprise a chalk additive, which increases stiffness of the polymer layer and increases transmission rates of water and oxygen.

The polymer layer may further comprise binders such as polymer binders, polyurethane binders, nitrocellulosis binders or polyester binders.

The polymer layer may further comprise slip additives, such as a wax, and/or softening, colouring and stiffening additives.

The polymer layer may in some embodiments comprise pores of a gas, usually air. In such embodiments the pores preferably constitute less than 50, preferably 40, more preferred 30, more preferred 20, more preferred 10, more preferred 5, most preferred 2, percent by volume of the polymer layer. In such embodiments the remaining, solid part of the polymer layer preferably comprises at least 70 percent by weight of a polymer type, preferably at least 80 percent by weight, more preferred at least 95 percent by weight, and most preferred at least 98 percent by weight.

In the context of this invention the water vapour transmission rate is measured according to standard test method ASTM F1249 at 38° C. and 90% atmospheric humidity and rated per 24 hours unless noted otherwise. The measuring method used is one known to the skilled person and which is conventional within the art. Any suitable method of measuring the water vapour transmission rate may be used, it being well known to the skilled person to convert values recorded under one set of conditions to another set of conditions.

In some embodiments the polymer layer has a water vapour transmission rate of at least 350 g/m$^2$, at least 400 g/m$^2$, at least 450 g/m$^2$, at least 500 g/m$^2$, at least 510 g/m$^2$, at least 520 g/m$^2$, at least 530 g/m$^2$, at least 540 g/m$^2$, at least 550 g/m$^2$, at least 560 g/m$^2$, at least 570 g/m$^2$, at least 580 g/m$^2$, at least 590 g/m$^2$, or at least 600 g/m$^2$ per 24 hours at 38° C. and 90% atmospheric humidity.

In some embodiments, said water vapour transmission rate is lower than or equal to 1200 g/m$^2$, 1100 g/m$^2$, 1000 g/m$^2$, 900 g/m$^2$, 800 g/m$^2$ or 700 g/m$^2$ per 24 hours at 38° C. and 90% atmospheric humidity. In some embodiments, said water vapour transmission rate is lower than or equal to 780 g/m$^2$, lower than or equal to 760 g/m$^2$, lower than or equal to 740 g/m$^2$, lower than or equal to 720 g/m$^2$ or lower than or equal to 700 g/m$^2$ per 24 hours at 38° C. and 90% atmospheric humidity.

As way of example, the water vapour transmission rate of the polymer layer may be in the range of 600 to 700 g/m$^2$, 500 to 800 g/m$^2$, 400 to 900 g/m$^2$, 300 to 1200 g/m$^2$ or preferably 300 to 1000 g/m$^2$ per 24 hours at 38° C. and 90% atmospheric humidity.

By providing the water vapour transmission rate at a specific interval, it is possible to create a desired atmosphere for the cheese, whereby spreading of the mould from the cheese can be controlled. Hereby the cheese will maintain the aesthetic desired surface appearance.

In some embodiments, the packaging sheet has an oxygen transmission rate of at least 2000 cm$^3$/m$^2$ per 24 hours per bar. This allows for good oxygen breathing of the packaged cheese. The oxygen transmission rate may be below 10000 cm$^3$/m$^2$ per 24 hours per bar. The oxygen transmission rate may be at least 2000 cm$^3$/m$^2$, 3000 cm$^3$/m$^2$, 4000 cm$^3$/m$^2$ or 5000 cm$^3$/m$^2$ per 24 hours per bar.

In some embodiments, an adhesive layer, preferably a layer mainly of, more preferred substantially constituted by, ethylene-acrylic ester-maleic anhydride (EMA) terpolymer, is provided between the paper layer and the polymer layer, the adhesive layer and the polymer layer being co-extruded on the paper layer. By co-extruding the adhesive layer and the polymer layer on the paper layer, the layers immediately adhere to each other and the tooling costs are lowered since both layers can be applied by the same machine. The manufacturing time is shortened accordingly since the application of both layers can be done at the same time, instead of having to apply an adhesive layer in a separate step prior to the application of the polymer layer.

The adhesive layer may consist essentially of one or more polymers, preferably polyethylene, more preferred low-density polyethylene (LDP).

In some embodiments, the coextruded adhesive and polymer layers are provided in the packaging sheet with an accumulated thickness corresponding to a weight of 9 g/m$^2$ of the sheet area, preferably 6 to 8 g/m$^2$, more preferred 6.5 to 7.5 g/m$^2$. The unit g/m$^2$ is a measure of mass per area of the layer measured in grams per square meter. It is a measure of the area density, sometimes denoted grammage, and can be considered a measure of the thickness of the layer since the thickness can be calculated when the volume density of the layer is known.

The adhesive layer may be provided in the packaging sheet with a thickness corresponding to 2 to 4.5 g/m$^2$, preferably 3 to 4 g/m$^2$, more preferred 3.25 to 3.75 g/m$^2$.

The polymer layer may be provided in the packaging sheet with a thickness corresponding to 2.5 to 5 g/m$^2$, preferably 3 to 4 g/m$^2$, more preferred 3.25 to 3.75 g/m$^2$.

By providing a co-extruded layer that is relatively thin compared to the prior art overall weight and material costs are lowered, and the pliability of the packaging sheet is increased. The co-extruded layer provides the desired water vapour transmission rate, enabling the packaged cheese to breathe and maintain the desired appearance.

In some embodiments the polymer layer as an alternative to PET mainly comprises, preferably is substantially constituted by, an ethylene-methyl acrylate copolymer lacquer of a type which is obtained by emulsifying ethylene-methyl acrylate copolymer in water. In that case the polymer layer is preferably provided in the packaging sheet with a thickness corresponding to 2 to 8 g/m$^2$, preferably 2 to 6 g/m$^2$, more preferred 2 to 4 g/m$^2$. This provides suitable transmission rates of water vapour and oxygen. By using ethylene-methyl acrylate copolymer lacquer in the polymer layer of the packaging sheet, it is possible to provide a packaging sheet that is both extremely thin and still fulfils the desired requirements such as a specific water vapour transmission rate enabling the cheese to maintain its appearance over time. Ethylene-methyl acrylate copolymer is marketed under the trade name Lotryl.

In some embodiments the paper layer extends over substantially an entirety of the first surface of the polymer layer.

In some embodiments the coloured layer comprises a binding agent. The binding agent may comprise cellulose nitrate.

In some embodiments the coloured layer comprises a pigment. The pigment may comprise titanium dioxide.

In a second aspect the invention involves a method for manufacturing a packaging sheet, the packaging sheet resulting from the method preferably being according to any one of claims 1 to 9, for packaging of cheese, in particular white moulded soft cheese, said packaging sheet having an inner surface and an outer surface, said inner surface being configured for facing the cheese in a packaged use position of the packaging sheet, the method comprising the steps of:

providing a paper layer with a first surface and a second surface, printing a coloured layer on a first surface of the paper layer, an outer surface of the coloured layer establishing said outer surface of the packaging sheet, and coating a polymer layer having a water-vapour-barrier of at least 500 g/m$^2$/24 hours (at 38° C. and 90% atmospheric humidity) onto the second surface of the paper layer with a first surface facing the paper layer, and a second surface establishing said inner surface of the packaging sheet.

Hereby, advantages and effects similar to the ones achieved according to the first aspect of the invention are achieved. Consequently, a method of producing a packaging sheet allowing the cheese to breathe continuously and thus maintain the desired appearance of both the cheese and sheet over time is provided.

In some embodiments the polymer layer is coated onto the second surface of the paper layer before the coloured layer is printed on the first surface of the paper layer.

In some embodiments the polymer layer and the coloured layer are applied to the paper layer at the same time.

In some embodiments the invention further comprises the step of:

increasing a surface roughness of the inner surface of the packaging sheet by means of embossing using an embossing roller with a surface roughness.

The term "emboss" as used herein comprises both processes of embossing and processes of debossing, the relevant effect being that a changed surface roughness is achieved. When the surface roughness is changed, a coarseness of the surface is affected. The roller may be any type of cylinder that rotates about a central axis. The surface roughness of the roller may be of varying size. The embossing of the inner surface of the packaging sheet may provide an embossing depth of 10-35 μm. Especially in embodiments where polymer layer comprising ethylene-methyl acrylate copolymer lacquer is applied, the inventors have discovered that with preferred relatively small thickness of the polymer layer according to the invention the inner surface of the polymer layer may become undesirably smooth, especially with thicknesses corresponding to a weight of 6-7 $g/m^2$. By roughening the inner surface the inner surface is less prone to change appearance when being in contact with the cheese or the atmosphere within the packaging.

In some embodiments the polymer layer mainly comprises, preferably is substantially constituted by, polyester, preferably PET, the method further comprising the steps of:

providing an adhesive layer, preferably mainly comprising, more preferred substantially constituted by, EMA terpolymer, and coextruding the adhesive layer and the polymer layer on the second surface of the paper layer.

In some embodiments the polymer layer mainly comprises, preferably is substantially constituted by, an ethylene-methyl acrylate copolymer lacquer of a type which is obtained by emulsifying ethylene-methyl acrylate copolymer in water, further comprising the step of:

coating the second surface of the paper layer with the ethylene-methyl acrylate copolymer lacquer.

The laquer may be coated on the second surface of the paper layer by flexographic printing, aniline printing and/or by smooth roller application.

In a third aspect the invention involves a method for wrapping or packaging cheese, in particular white moulded soft cheese, in a packaging sheet according to the first aspect of the invention, comprising the steps of:

providing a piece of cheese, and wrapping the cheese in the packaging sheet, at least part of the inner surface of the packaging sheet abutting the cheese.

In some embodiments the method further comprises the subsequent steps of:

enclosing the packaging sheet in a further external layer, said external layer preferably being a transparent shrink film, applying a label to said external layer, said label having an outer side suitable for displaying information regarding said cheese and an inner side with an adhesive layer, said inner side being configured for facing and being attached to the packaging sheet by means of said adhesive layer, and connecting edges of the external layer on one side of said cheese by means of the label to thereby seal the cheese and form a cheese package.

Consequently, enclosing the packaging sheet in the external layer allows the packaging sheet to be protected from outside influence.

The shrink film (also known as shrink wrap) may be a polymer plastic film, e.g. of polyolefin, PVC, polyethylene or polypropylene or a combination of these.

The different aspects of the present invention can be implemented in different ways including as packaging sheets for packaging of cheese, methods of manufacturing packaging sheets and methods for wrapping cheese in packaging sheets, each yielding one or more of the benefits and advantages described in connection with at least one of the aspects described above, and each having one or more preferred embodiments corresponding to the preferred embodiments described in connection with at least one of the aspects described above and/or disclosed in the dependent claims.

Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention will be further outlined by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced. Note that for illustrative purposes the dimensions of especially thicknesses of the different sheets shown are exaggerated.

Figure 1:
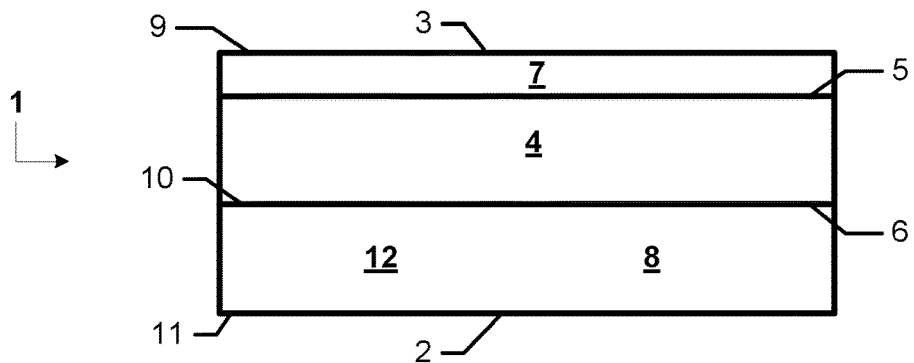
FIG. 1 shows a schematic view of a packaging sheet according to an embodiment of the present invention.
Figure 2:
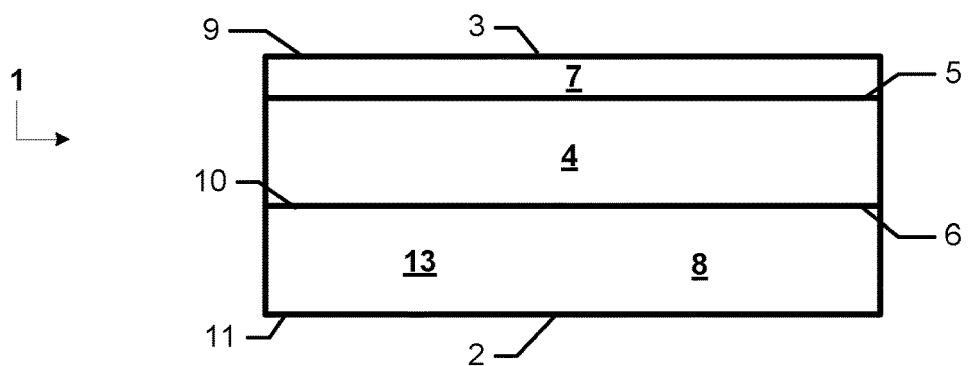
FIG. 2 shows a schematic view of a packaging sheet according to another embodiment of the present invention.
Figure 4:
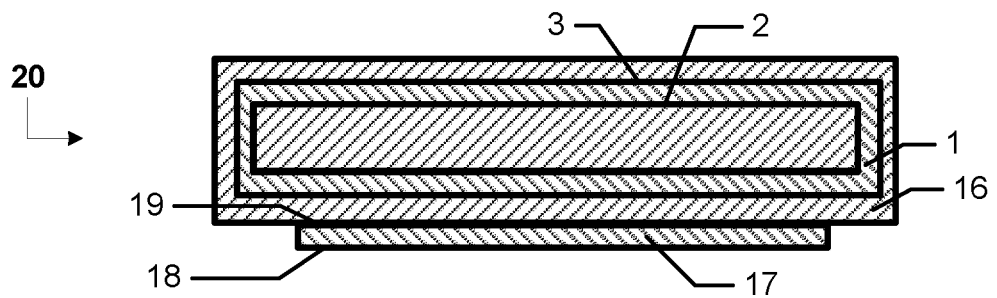
FIG. 4 schematically shows a piece of cheese wrapped in a packaging sheet according to an embodiment of the present invention.

FIGS. 1 and 2 show a packaging sheet 1 for packaging of one or more pieces of cheese 15, in particular white moulded soft cheese, as shown in FIG. 4. The packaging sheet 1 comprises an inner surface 2 and an outer surface 3. The inner surface 2 faces the cheese 15 in the packaged use position of the packaging sheet 1 shown in FIG. 4. The packaging sheet 1 comprises a paper layer 4. The paper layer 4 has a first surface 5 and a second surface 6. The packaging sheet 1 comprises a coloured layer 7. The coloured layer 7 is provided on the first surface 5 of the paper layer. An outer surface 9 of the coloured layer 7 establishes the outer surface 3 of the packaging sheet 1. The packaging sheet 1 further comprises a polymer layer 8. The polymer layer 8 has a first surface 10 and a second surface 11. The polymer layer 8 has a water vapour transmission rate of at least 300 $g/m^2/24$ hours at 38° C. and 90% atmospheric humidity. The polymer layer 8 is coated on the second surface 6 of the paper layer 4. Thereby the first surface 10 of the polymer layer 8 faces the paper layer 4. And the second surface 11 establishes the inner surface 2 of the packaging sheet 1. The packaging sheet 1 further has a water vapour transmission rate lower than or equal to 1000 $g/m^2/24$ hours at 38° C. and 90% atmospheric humidity. The packaging sheet 1 has an oxygen transmission rate higher than or equal to 2000 cm³/m²/24 hours/bar. The paper layer 4 extends over substantially an entirety of the first surface 10 of the polymer layer 8.

FIG. 1 shows a polymer layer 8, which is a polyester layer 12, specifically a PET layer.

FIG. 2 shows a polymer layer 8, which is an ethylene-methyl acrylate copolymer lacquer 13. The lacquer 13 may be of a type which is obtained by emulsifying ethylene-methyl acrylate copolymer in water. The ethylene-methyl acrylate copolymer lacquer 13 is provided at 2 to 8 g/m², preferably 2 to 6 g/m², more preferred 2 to 4 g/m².

Figure 3:
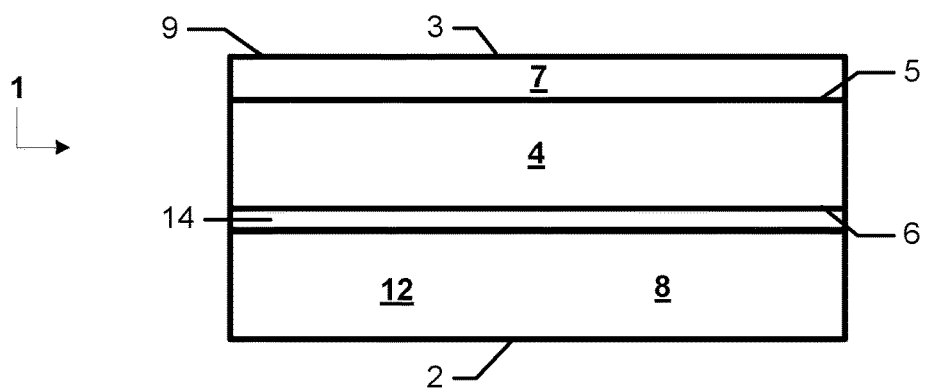
FIG. 3 shows a schematic view of a packaging sheet according to another embodiment of the present invention.

FIG. 3 shows a packaging sheet 1 as described with reference to to FIG. 1 where an adhesive layer 14 is furthermore provided between the paper layer 4 and the polyester layer 12 for adhesion of the layers together. The adhesive layer 14 is preferably a layer of ethylene-acrylic ester-maleic anhydride (EMA) terpolymer. The adhesive layer 14 and the polyester layer 12 are co-extruded on a second surface 6 of the paper layer 4. The coextruded adhesive layer 14 and polyester layer 12 are provided at 5 to 9 g/m², preferably 6 to 8 g/m², more preferred 6.5 to 7.5 g/m².

Figure 5:
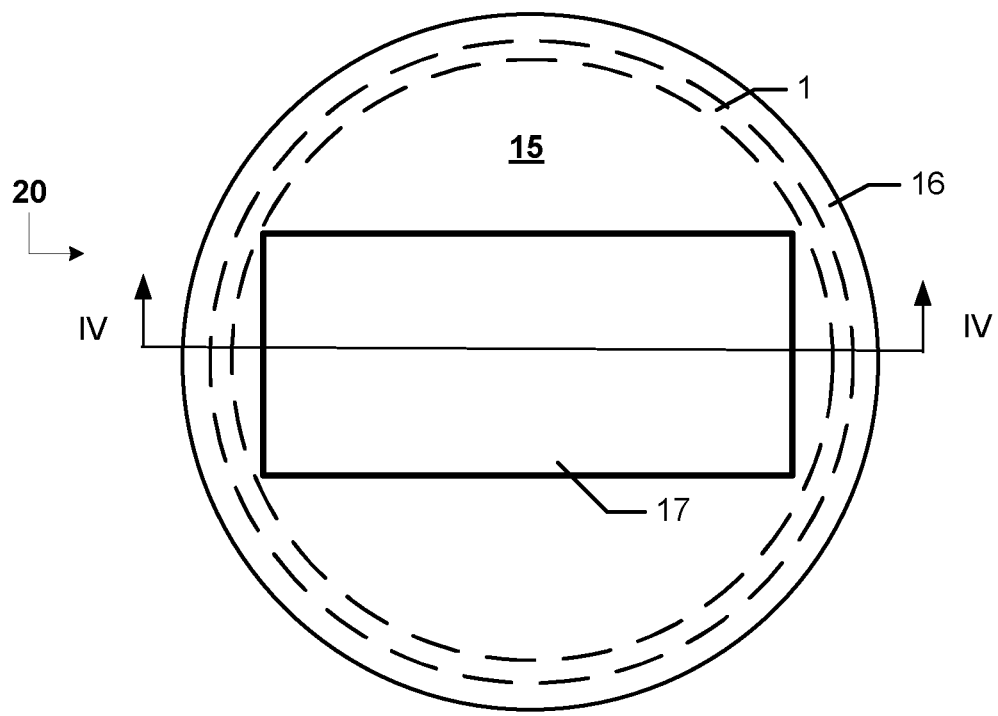
FIG. 5 is a cross sectional view of the cheese package of FIG. 4 taken along the line IV-IV of FIG. 4.

FIGS. 4 and 5 show different view of a packaged piece of white moulded soft cheese 15 forming a cheese package 20. The cheese package 20 may be arrived at by firstly cutting out or otherwise providing a piece of the cheese 15 of suitable size and shape. A suitable size may be 2-4 by 2-20 by 2-20 cm. A packaging sheet 1, which may be according to any one of the above described embodiments, is cut out from a larger piece of packaging sheet (not shown), specifically a long length of wrapping of packaging sheet, which is conventionally rolled off of a large roll and led into a cutting machine that cuts out suitable pieces of the larger packaging sheet into sheet sizes and shapes suitable for being wrapped around the cheese 15. Such a roll may have a width of 1-2 m and a rolled up sheet length of several hundred meters. The cut out packaging sheet 1 may be cut into a rectangular or square of 5-30 by 5-30 cm. Next, the cheese 15 is wrapped in the cut out packaging sheet 1 as will be described in the following.

First the plane, i.e. un-folded and un-bent, packaging sheet 1 is positioned on a plane packaging surface, and the cheese 15 is positioned substantially centrally on with a lower surface abutting the packaging sheet 1. Then the peripheral edges of the packaging sheet 1 are lifted upwards from the plane surface and are led towards each other above the cheese 15 until the cheese 15 is wrapped within, enclosed by the packaging sheet 1. In this situation a main part of an inner surface 2 of the packaging sheet 1 abuts the cheese 15. Then a transparent shrink film sheet 16 is wrapped in the same conventional manner to enclose the cheese 15 wrapped in the packaging sheet 1. The shrink film or shrink wrap is of a conventional type, which gains an adhesive effect when being heated so that the shrink film in the resultant package adheres to the outer surface 9 of the resultant cheese package 20 and also maintains a structural integrity of the cheese package as is known to the skilled person.

Then the external shrink film sheet 16 is provided with a rectangular paper label 17, preferably using a label application machine. The label 17 is suitable for displaying information regarding the cheese 15. The label 17 has an outer side 18 and an inner side 19. The inner side 19 is configured for facing the cheese 15. An adhesive (not shown) is provided on the inner side 19 of the label 17. The edges (not shown) of the external layer 16 and/or the packaging sheet 1 are connected on an upper side of the cheese package 20 by means of the label 17, which in a conventional manner is applied onto the sheet edges that are all assembled near a center of an upper surface of the cheese package 20, see FIG. 5. Thereby the cheese 15 is sealed from the environment and forms the resultant closed cheese package 20.

Note that FIG. 4 shows the package 20 with a rectangular cross sectional shape. Usually the package will of course have softer edges that follow the curved outer peripheral surface of the cheese 15 so that the package may more resemble an ellipse in the cross section shown.

The cheese package may have other sizes such as for example substantially triangular when seen from above to include a substantially triangular piece of cheese. In another embodiment a round cheese similar to the one shown in FIG. 5 is divided into a number of substantially triangular cheese pieces that may each be individually wrapped in a package sheet and positioned in a shape as shown in FIG. 5 after which the wrapped cheese pieces, which may be positioned in a tray to keep their mutual positions, are wrapped with a shrink film in the exact same manner as described above in connection with FIG. 5.

Figure 6:
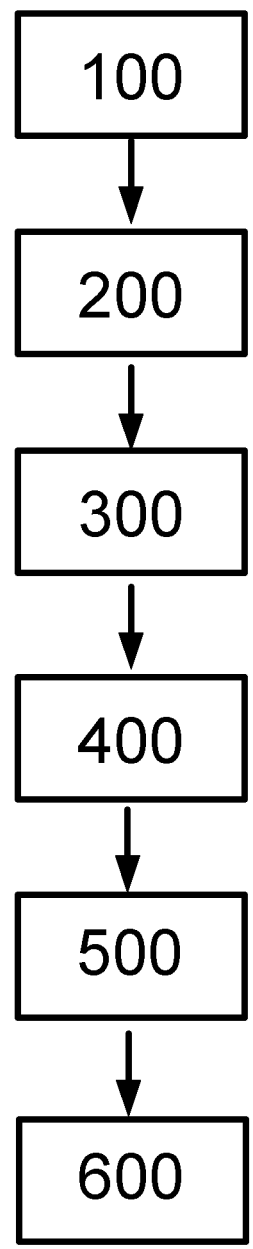
FIG. 6 shows a flowchart of a method for manufacturing a packaging sheet according to an embodiment of the present invention.

FIG. 6 illustrates an embodiment of the method according to the invention for manufacturing a packaging sheet 1 according to any one of the above embodiments. In the following each step of the method will be described in sequence.

In step 100 the packaging sheet 1 is provided. In step 300 the coloured layer 7 is printed on the first surface 5 of the paper layer 4 in a conventional method for printing on paper, the skilled person being able to choose a suitable method. In step 400 the polymer layer 8 is coated in a conventional manner directly onto the second surface 6 of the paper layer 4, which provides adherence between the two layers. This coating step may also be performed in a conventional manner. The adhesive layer 14 of the embodiment of FIG. 3 may optionally be coextruded with the polymer layer 8 in step 400 to provide improved adhesion. Alternatively, the polymer layer 8 may be an ethylene-methyl acrylate copolymer lacquer of a type which is obtained by emulsifying ethylene-methyl acrylate copolymer in water as shown in FIG. 2 in which case the second surface 6 of the paper layer 4 is coated by applying the ethylene-methyl acrylate copolymer lacquer onto it. This lacquer 13 is applied onto the paper layer 4 in a liquid form and may for example be applied using flexographic printing or using a smooth roller. It may alternatively be sprayed onto the paper layer 4 or applied using a blade. When the lacquer has been applied in a suitable, substantially uniform thickness across the entire surface 6, it is allowed to dry and harden. Finally, in step 600 a roller with a surface roughness may be applied to emboss the inner surface 2 of the packaging sheet 1 to increase the surface roughness of the inner surface 2. After this step the resultant packaging sheet 1 is usually rolled up to form a roll with a large length of sheet. Then the roll may be stored until it is transported to a cutting machine in which the length of sheet is rolled off of the roll and guided into a cutting machine, which via cutting blades cuts the sheet 1 into several (pieces of) packaging sheets of desired shapes and sizes. The resultant multiplicity of (pieces of) packaging sheets 1 may then be stacked into stacks of several hundred sheets and may be stored or transported to a manufacturing line for wrapping or packaging cheese in a manner as described above.

Although some embodiments have been described and shown in detail herein, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A packaging sheet for packaging of cheese, comprising
    an inner surface and an outer surface of the packaging sheet, said inner surface being configured for facing the cheese in a packaged use position of the packaging sheet,
    a paper layer with a first surface and a second surface, the paper layer having a thickness in the range of 25 to 50 g/m$^2$,
    a coloured layer provided at or on the first surface of the paper layer, an outer surface of the coloured layer establishing said outer surface of the packaging sheet, and
    a polymer layer with a water vapour transmission rate in a range of at least 300 g/m$^2$/24 hours to 1200 g/m$^2$/24 hours at 38° C. and 90% atmospheric humidity, the polymer layer being positioned at the second surface of the paper layer with a first surface of the polymer layer facing the paper layer and a second surface of the polymer layer establishing said inner surface of the packaging sheet, wherein the polymer layer comprises polyester or polyethylene terephthalate (PET), wherein the polymer layer is nonporous,
    wherein the packaging sheet has an oxygen transmission rate of at least 2000 cm$^3$/m$^2$/24 hours/bar.

2. The packaging sheet according to claim 1, wherein an adhesive layer is provided between the paper layer and the polymer layer, the adhesive layer and the polymer layer being co-extruded on the paper layer.

3. The packaging sheet according to claim 2, wherein the adhesive layer comprises ethylene-acrylic ester-maleic anhydride (EVA) terpolymer.

4. The packaging sheet according to claim 2, wherein the coextruded adhesive and polymer layers are provided in the packaging sheet with an accumulated thickness corresponding to a weight of 5 to 9 g/m$^2$.

5. The packaging sheet according to claim 2, wherein the adhesive layer consists of ethylene acrylic ester maleic anhydride (EMA) terpolymer.

6. The packaging sheet according to claim 1, wherein the paper layer extends over a majority of the first surface of the polymer layer.

7. The packaging sheet according to claim 6, wherein the paper layer extends over an entirety of the first surface of the polymer layer.

8. A packaging sheet for packaging of cheese, comprising
    an inner surface and an outer surface of the packaging sheet, said inner surface being configured for facing the cheese in a packaged use position of the packaging sheet,
    a paper layer with a first surface and a second surface, the paper layer having a thickness in the range of 25 to 50 g/m$^2$,
    a coloured layer provided at or on the first surface of the paper layer, an outer surface of the coloured layer establishing said outer surface of the packaging sheet, and
    a polymer layer with a water vapour transmission rate in a range of 300 g/m$^2$/24 hours to 1200 g/m$^2$/24 hours at 38° C. and 90% atmospheric humidity, the polymer layer being positioned at the second surface of the paper layer with a first surface of the polymer layer facing the paper layer and a second surface of the polymer layer establishing said inner surface of the packaging sheet, wherein the polymer layer comprises an ethylene-methyl acrylate copolymer lacquer of a type which is obtained by emulsifying ethylene-methyl acrylate copolymer in water,
    wherein the packaging sheet has an oxygen transmission rate of at least 2000 cm$^3$/m$^2$/24 hours/bar, wherein the polymer layer is nonporous.

9. The packaging sheet according to claim 8, wherein the polymer layer is provided with a thickness corresponding to 2 to 8 g/m$^2$.

10. The packaging sheet according to claim 8, wherein the polymer layer is provided with a thickness corresponding to 2 to 6 g/m$^2$.

11. The packaging sheet according to claim 8, wherein the paper layer extends over a majority of the first surface of the polymer layer.

12. The packaging sheet according to claim 11, wherein the paper layer extends over an entirety of the first surface of the polymer layer.

* * * * *